US011819378B2

(12) United States Patent
Singhal (10) Patent No.: US 11,819,378 B2
(45) Date of Patent: Nov. 21, 2023

(54) ORTHODONTIC BRACKET COVERING LIGATURE TIE

(71) Applicant: Sudiksha Singhal, Grand Forks, ND (US)

(72) Inventor: Sudiksha Singhal, Grand Forks, ND (US)

( * ) Notice: Subject to any disclaimer, the term of this patent is extended or adjusted under 35 U.S.C. 154(b) by 0 days.

(21) Appl. No.: 17/697,234

(22) Filed: Mar. 17, 2022

(65) Prior Publication Data

US 2022/0313396 A1 Oct. 6, 2022

Related U.S. Application Data

(60) Provisional application No. 63/169,516, filed on Apr. 1, 2021.

(51) Int. Cl.
*A61C 7/12* (2006.01)
*A61C 7/28* (2006.01)

(52) U.S. Cl.
CPC .............. *A61C 7/125* (2013.01); *A61C 7/28* (2013.01)

(58) Field of Classification Search
CPC .. A61C 7/125; A61C 7/14; A61C 7/28; A61C 7/30; A61C 7/303; A61C 7/306; A61C 2201/00; F16F 1/3732
USPC ............................................ 433/8, 10, 11, 13
See application file for complete search history.

(56) References Cited

U.S. PATENT DOCUMENTS

| | | | | |
|---|---|---|---|---|
| 1,697,814 A * | 1/1929 | Forbes | ................. | F16F 1/3732 277/606 |
| 2,716,566 A * | 8/1955 | Thiry | ....................... | F16F 1/545 29/451 |
| 3,621,413 A * | 11/1971 | Hilbert | .................... | H01R 13/59 439/462 |
| 4,687,441 A * | 8/1987 | Klepacki | ................. | A61C 7/303 433/8 |
| 4,913,654 A * | 4/1990 | Morgan | ................... | A61C 7/125 433/11 |
| 5,184,954 A * | 2/1993 | Hanson | ................... | A61C 7/303 433/18 |
| 5,829,974 A * | 11/1998 | Brosius | .................. | A61C 7/303 433/11 |
| 6,347,939 B2* | 2/2002 | Abels | ...................... | A61C 7/125 433/10 |
| 10,624,719 B2* | 4/2020 | Darling | .................... | A61C 7/28 |

(Continued)

FOREIGN PATENT DOCUMENTS

| CA | 2738187 A1 * | 10/2012 | ............... A61C 7/14 |
|---|---|---|---|
| CA | 27438187 A1 | 10/2012 | |

(Continued)

OTHER PUBLICATIONS

International Search Report and Written Opinion for corresponding PCT Application No. PCT/US2022/015908, dated May 5, 2022.

*Primary Examiner* — Nicholas D Lucchesi
(74) *Attorney, Agent, or Firm* — MEAGHER EMANUEL LAKS GOLDBERG & LIAO, LLP (57) ABSTRACT

A brace cap is disclosed, and a method for using such. The brace cap has an annular design with an asymmetric c-shape rotated around a central axis, configured to surround a brace bracket to prevent the brace bracket from irritating adjacent surfaces within a mouth of a user. The asymmetric c-shape has a first arm and a second arm, where the first arm is longer than the second arm.

23 Claims, 7 Drawing Sheets

(56) References Cited

U.S. PATENT DOCUMENTS

| | | | | |
|---|---|---|---|---|
| 2001/0029008 | A1* | 10/2001 | Jordan | A61C 7/02 |
| | | | | 433/10 |
| 2003/0075186 | A1* | 4/2003 | Florman | A61F 5/0006 |
| | | | | 128/869 |
| 2006/0172247 | A1* | 8/2006 | Abels | A61C 7/14 |
| | | | | 433/10 |
| 2006/0257808 | A1* | 11/2006 | Feller | A61C 7/30 |
| | | | | 433/2 |
| 2010/0081106 | A1* | 4/2010 | Park | A61C 7/125 |
| | | | | 433/8 |
| 2010/0129765 | A1* | 5/2010 | Mohr | A61C 7/12 |
| | | | | 433/10 |
| 2011/0136071 | A1* | 6/2011 | Levens | A61C 7/125 |
| | | | | 433/13 |
| 2012/0028207 | A1* | 2/2012 | Cleary | A61C 7/00 |
| | | | | 433/10 |
| 2013/0236847 | A1* | 9/2013 | Shin | A61C 7/16 |
| | | | | 433/9 |
| 2016/0256241 | A1* | 9/2016 | Wigal | A61C 7/303 |
| 2017/0202643 | A1* | 7/2017 | Paehl | A61C 7/303 |
| 2018/0368946 | A1* | 12/2018 | MacLaine | A61C 7/30 |

FOREIGN PATENT DOCUMENTS

| | | | |
|---|---|---|---|
| CN | 2130511 Y | * | 4/1993 |
| CN | 2130511 Y | | 4/1993 |

* cited by examiner

ORTHODONTIC BRACKET COVERING LIGATURE TIE

CROSS-REFERENCE TO RELATED APPLICATIONS

This application claims priority to U.S. Provisional Patent Application No. 63/169,516, filed on Apr. 1, 2021, the entirety of which is incorporated by reference herein.

TECHNICAL FIELD

The present disclosure relates to the field of orthodontics, and specifically to orthodontic brackets for, e.g., covering ligature tie.

BACKGROUND

Figure 1:
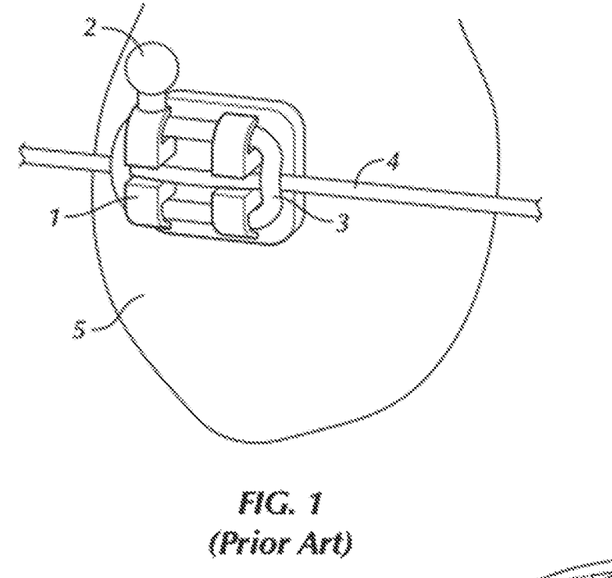
FIG. 1 (Prior Art) is an image of an orthodontic brace bracket.

Orthodontic brackets, such as those seen in FIG. 1, often have sharp edges that poke the inside of patients' cheeks and sometimes even the inner lip. The extension piece 2 (which may be a hook) that stretches out of a brace bracket 1 often digs into patients' mouths. They can create cuts and imprints in the patient's inner cheek and lips. These cuts can form braces sores which resemble canker sores. They are extremely painful, and braces cuts can make it hard to talk and take a week or two to heal. However, it often takes longer because as a patient's mouth starts to heal the edge continues hitting that area of the mouth, furthering the injury. Braces cuts and sores are common complaints from patients. This type of issue is extremely prevalent but does not seem to have a permanent solution.

To date, one of the most preferred solution for bracket cuts and sores is to use what is called orthodontic wax. Orthodontic wax is a soft pliable medical-grade wax, generally provided as a block of wax, that can be easily molded. Patients take the wax in their hands and soften it using body heat, they then proceed to place the softened wax over the bracket causing irritation. It is not a way to avoid the issue, but rather a way to stop an injury from worsening. Orthodontic wax is extremely soft and pliable in warm temperatures like those present within a patient's mouth. Therefore, the wax often moves away from its position when pressure is applied, leaving patients' cheeks and lips vulnerable. Furthermore, placement can be difficult, and the wax may take a few tries to properly adhere to the bracket. Orthodontic wax also leaves a residue upon removal that needs to be removed only through brushing one's teeth, this can become inconvenient when a patient is not at home. Additionally, wax cannot be worn while eating. This is extremely detrimental because while eating a patient is opening and closing their mouth causing the edges to rub up against the patient's inner lip and cheeks creating or worsening injuries.

Figure 2:
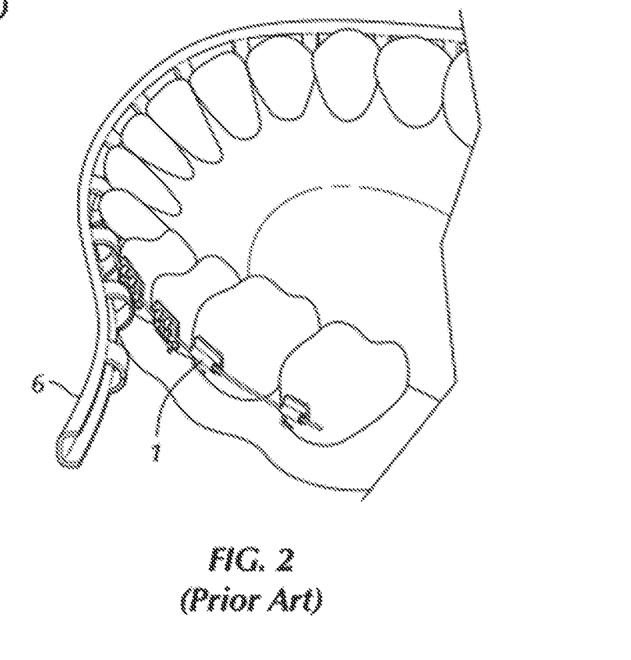
FIG. 2 (Prior Art) is an image of a lip bumper that is currently used in an attempt to prevent brace brackets from irritating adjacent surfaces within a mouth of a user.

As seen in FIG. 2, comfort lip shields or lip bumpers 6 are an alternative solution for cuts and sores from brace brackets 1. These are reinforced strips that cover the full length of the patient's mouth (cheek-to-cheek). Comfort lip shields are commonly formed from strips of flexible, invisible plastic, are shaped such that each strip wraps around a respective set of orthodontic brackets 1 (i.e., around a top set or a bottom set). These strips are effective at preventing injuries from worsening; however, they cannot be worn on a daily basis. Much like the orthodontic wax, comfort lip shields also cannot be worn while eating. Comfort lip shields are also quite expensive for the patients in comparison to orthodontic wax, and they can interfere with treatment, as it is difficult to wear them with rubber bands.

To overcome the limitations of existing solutions, there is a need for an orthodontic solution that is convenient, effective, and cost effective. The solution must be convenient to use for patients, providing minimal hassle, and easily accessible to patients. The design must effectively address the issue of braces sores and cuts—preferably through injury prevention. It should also be effective during sleeping and eating. The design must be feasible from a cost perspective—preferably within the price range of alternatives.

BRIEF SUMMARY

The present disclosure is drawn to an orthodontic bracket covering ligature tie (often referred to herein as a "brace cap") that overcomes one or more limitations of the existing solutions discussed above.

In embodiments, a central body is defined by an asymmetrical c-shape rotated around a central axis, the asymmetrical c-shape having a first arm and a second arm each extending towards the central axis, wherein the first arm is longer than the second arm, and wherein central body is configured to surround a brace bracket and prevent the brace bracket from irritating adjacent surfaces within a mouth of a user.

In some embodiments, the brace cap may be configured to be used in place of a ligature tie. In some embodiments, the brace cap may be configured to be placed over a ligature tie.

In some embodiments, the central body of the brace cap may be configured to have a total thickness greater than or equal to 2.0 mm and less than or equal to 2.5 mm, and is preferably 2.1 mm. In some embodiments, the central body of the brace cap may be configured to have an outer diameter greater than or equal to 3 mm and less than or equal to 5 mm, and is preferably 4 mm. In some embodiments, the first arm of the brace cap may be configured to define a first inner diameter of the central body, where the first inner diameter is greater than or equal to 0.75 mm and less than or equal to 1.25 mm, and is preferably 1 mm. In some embodiments, the second arm of the brace cap may be configured to define a second inner diameter of the central body, where the second inner diameter is greater than or equal to 1.25 mm and less than or equal to 1.75 mm, and is preferably 1.5 mm. In some embodiments, the central body of the brace cap may be configured to have a maximum inner diameter that is greater than or equal to 2 mm and less than or equal to 4 mm, and is preferably 3 mm In some embodiments, the brace cap may further comprise an expandable section that extends radially outward from the central body and is adapted to surround at least one structure (such as a hook) that extends from the brace bracket.

In some embodiments, the expandable section is configured to have a maximum inner diameter that is greater than or equal to 0.7 mm and less than or equal to 0.9 mm, and is preferably 0.8 mm. In some embodiments, the expandable section is configured to have a minimum inner diameter, when not expanded, that is greater than or equal to 0.1 mm and less than or equal to 0.3 mm. In some embodiments, the expandable section is configured to have a maximum outer diameter that is greater than or equal to 0.9 mm and less than or equal to 1.1 mm, and is preferably 1 mm. In some embodiments, the expandable section is configured to extend no more than 2.1 mm from the outer surface of the central body. In some embodiments, the expandable section comprises a plurality of segments connected in an accordion-like configuration. In some embodiments, a portion of the expandable section is coupled to a portion of an internal surface of the central body.

In some embodiments, the brace cap is comprised of an elastomer.

A second aspect of the present disclosure is drawn to a kit, comprising a plurality of brace caps as described previously. In some embodiments, each brace cap in the kit comprises an expandable section. In some embodiments, a plurality of brace caps in the kit comprise an expandable section, and a plurality of brace caps in the kit do not.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale.

DETAILED DESCRIPTION

Embodiments of the present disclosure are described in detail with reference to the figures wherein like reference numerals identify similar or identical elements. It is to be understood that the disclosed embodiments are merely examples of the disclosure, which may be embodied in various forms. Well known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Figure 3:
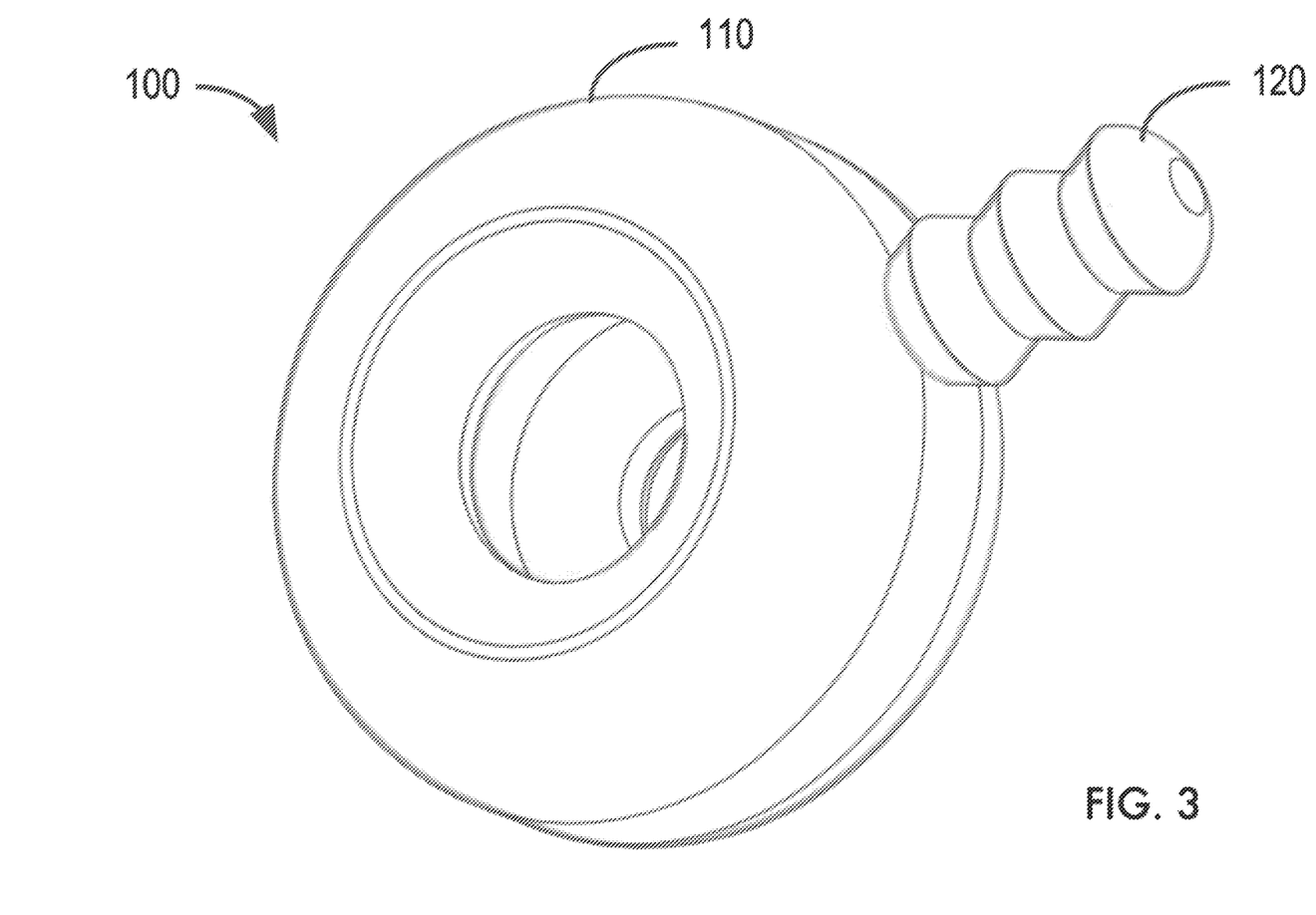
FIG. 3 is a schematic illustration of an embodiment of a brace cap.

Referring to FIG. 3, an embodiment of a brace cap 100 for preventing irritation and injury from orthodontic brace brackets can be seen. The brace cap 100 will generally comprise a central body 110 and in some embodiments, may comprise an expandable section 120 that extends radially outward from the central body 110 and is configured to cover, e.g., a hook or any other structure that may extends from a brace bracket (See, e.g., extension piece 2, which may be a hook, in FIG. 1).

By cover, it is intended to mean that a portion of the brace cap is between the brace bracket, etc., and a portion of the body that could be damaged or irritated by said brace bracket, etc. (e.g., the inner cheek of a user, lips, gums, etc.).

Figure 4A:
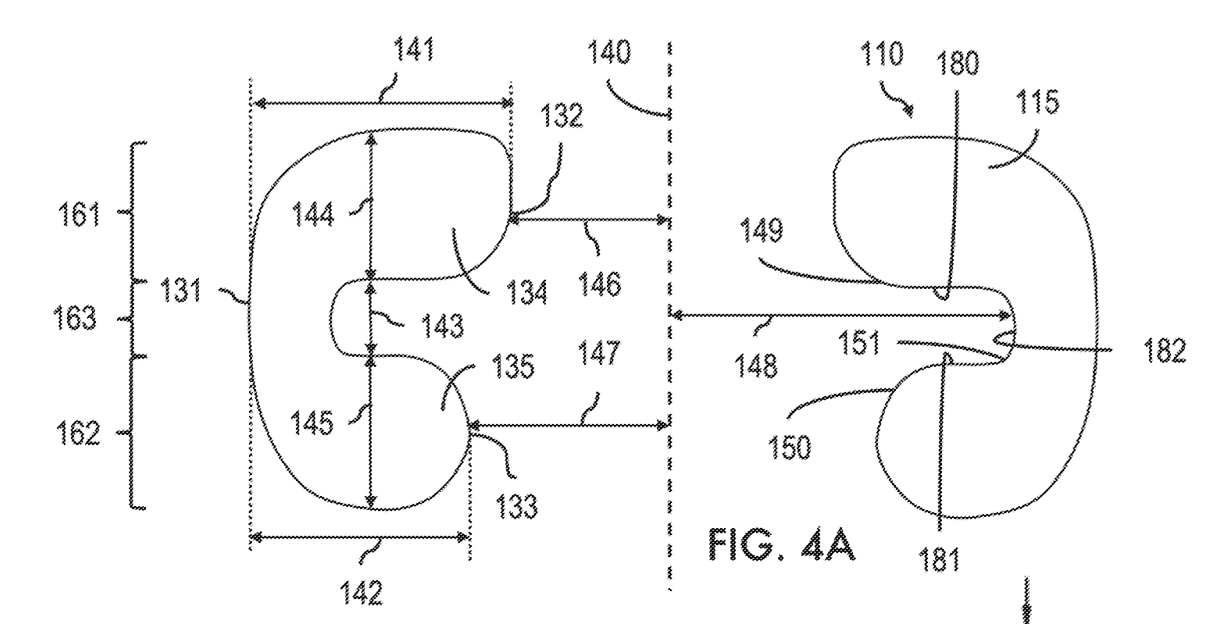
FIG. 4A is a cross-sectional view of an embodiment of a central body of a brace cap.

Referring to FIG. 4A, embodiments of the central body 110 can be seen. The central body 110 is defined by an asymmetrical c-shape 115 rotated around a central axis 140, the asymmetrical c-shape 115 having a first arm 134 and a second arm 135 each extending radially towards the central axis 114. The two arms of the asymmetrical c-shape are not the same length. Rather, the first arm 134 is longer than the second arm 135. That is, a first distance 141 from the outermost point 131 of the central body 110 to the innermost point 132 of the first arm 134 is greater than a second distance 142 from the outermost point 131 of the central body 110 to the innermost point 133 of the second arm 135.

In some embodiments, the innermost point 132 of the first arm 134 is offset radially from the central axis 140 by a first radius 146. In some embodiments, the first radius may be between 0.375 mm and 0.625 mm. That is, in some embodiments, the first arm may be configured to define a first inner diameter (double the first radius 146) of the central body, where the first inner diameter is greater than or equal to 0.75 mm and less than or equal to 1.25 mm. In some embodiments, the first inner diameter of the central body is 1 mm.

In some embodiments, the innermost point 133 of the second arm 135 is offset radially from the central axis 140 by a second radius 147. In some embodiments, the second radius may be between 0.625 mm and 0.875 mm. That is, in some embodiments, the second arm may be configured to define a second inner diameter (double the second radius 147) of the central body, where the first inner diameter is greater than or equal to 1.25 mm and less than or equal to 1.75 mm. In some embodiments, the first inner diameter of the central body is 1.5 mm In some embodiments, the asymmetrical c-shape can be considered to have three sections connected in an axial direction—a first section 161 that contains the first arm 134, a second section 162 that contains the second arm 135, and a middle section 163 that is sandwiched between the first section and the second section. In some embodiments, the asymmetrical c-shape 115 is configured such that the central body has maximum inner radius 148. In some embodiments, the maximum inner diameter is defined by the middle section 163 of the asymmetrical c-shape 115. In some embodiments, the central body is configured to define a maximum inner diameter (double the maximum inner radius 148) that is greater than or equal to 2 mm and less than or equal to 4 mm. In some embodiments, the maximum inner diameter is 3 mm.

In some embodiments, the first arm and the second arm are separated by a middle distance 143. In some embodiments, this middle distance 143 is between 0.35 and 0.45 mm. In some embodiments, this middle distance is between 0.40 and 0.41 mm.

The first arm has a first thickness 144 (in the axial direction), and the second arm has a second thickness 145 (in the axial direction). In some embodiments, the first thickness and the second thickness are the same. In some embodiments, the first thickness is different from the second thickness. In some embodiments, the difference between the first thickness and the second thickness is greater than 0 mm and less than or equal to 0.1 mm. In some embodiments, the first thickness is greater than or equal to 0.8 mm and less than or equal to 0.9 mm. In some embodiments, the first thickness is greater than or equal to 0.8 mm and less than or equal to 0.85 mm. In some embodiments, the second thickness is greater than or equal to 0.8 mm and less than or equal to 0.9 mm. In some embodiments, the second thickness is greater than or equal to 0.84 mm and less than or equal to 0.85 mm.

In some embodiments, the first arm 134, at least a portion of a surface extending towards the central axis 140, has a radius of curvature 149 between 0.4 and 0.5 mm. In some embodiments, the first arm 135, at least a portion of a surface extending towards the central axis 140, has a radius of curvature 150 between 0.4 and 0.5 mm. In some embodiments, the radius of curvature 149 on an internal-facing surface 180 (e.g., a surface that defines an internal cavity within the central body, formed by internal surfaces of the first arm 134, the second arm 135, and a portion of the middle section 163) of first arm 134 is the same as the radius of curvature 150 on an internal-facing surface 181 of the second arm 135. In some embodiments, the radius of curvature 149 on an internal-facing surface 180 of first arm 134 is different from the radius of curvature 150 on an internal-facing surface 181 of the second arm 135.

In some embodiments, on an internal-facing surface of the central body, a portion of the internal-facing surface connecting the second section 162 with the middle section 163 has a radius of curvature 151 that is greater than or equal to 0.1 mm and less than or equal to 0.3 mm. In some embodiments, the radius of curvature 151 is 0.2 mm. In some embodiments, the internal-facing surface is free of corners. In some embodiments, the internal-facing surface 182 of the middle portion 163 is curved and otherwise free of planar surfaces.

Figure 4B:
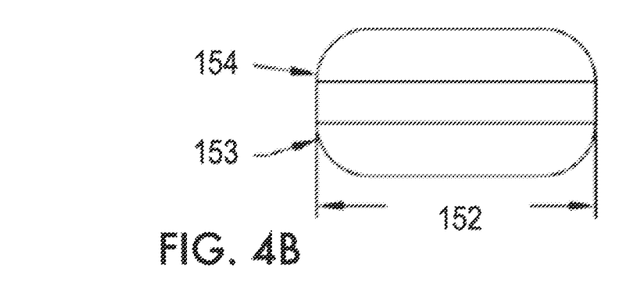
FIGS. 4B and 4C are side views of an embodiment of a central body of a brace cap.

Referring to FIG. 4B, the brace cap may be configured such that an outer diameter 152 of the central body is greater than or equal to 3 mm and less than or equal to 5 mm. In some embodiments, the outer diameter of the central body is 4 mm.

The outward-facing edges of the central body may be curved. In some embodiments, an outward-facing surface of the first section 161 has a radius of curvature 154 that is greater than or equal to 0.1 mm and less than or equal to 0.9 mm. In some embodiments, the radius of curvature 154 is greater than or equal to 0.7 mm and less than or equal to 0.8 mm. In some embodiments, the radius of curvature 154 is 0.75 mm.

In some embodiments, an outward-facing surface of the second section 162 has a radius of curvature 155 that is greater than or equal to 0.1 mm and less than or equal to 0.9 mm. In some embodiments, the radius of curvature 155 is greater than or equal to 0.7 mm and less than or equal to 0.8 mm. In some embodiments, the radius of curvature 155 is 0.75 mm.

In some embodiments, the radius of curvature 154 of an outward-facing surface of the first section 161 is the same as the radius of curvature 155 of an outward-facing surface of the second section 162. In some embodiments, the radius of curvature 154 of an outward-facing surface of the first section 161 is different from the radius of curvature 155 of an outward-facing surface of the second section 162.

Figure 4C:
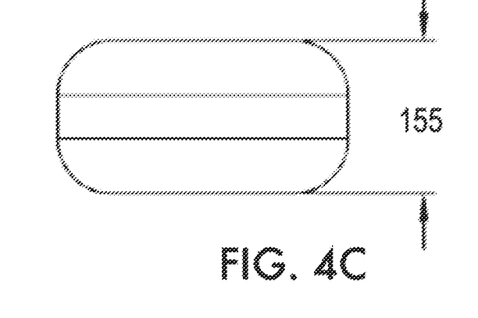

Referring to FIG. 4C, in some embodiments, the brace cap may have a total thickness 155 of the central body that is greater than or equal to 2.0 mm and less than or equal to 2.5 mm. In some embodiments, the total thickness 155 is 2.1 mm.

In some embodiments, the brace cap 100 may be manufactured without an expandable section 120 (i.e., the brace cap is free of an expandable section). In this regard, the brace cap 100 may simply include the central body 110 as described above.

However, in other embodiments, the brace cap may further comprise an expandable section 120. The expandable section 120 may extend radially outward from the central body and is adapted to surround at least one structure that extends from the brace bracket. In some embodiments, the expandable section 120 may be fully collapsed when there are no hooks/extensions that need to be covered. The expandable section 120 provides additional protection by wrapping around any hooks or other extensions in the bracket (see extension piece 2 in FIG. 1). The expandable section 120 is configured to expand to define an internal cavity capable of slidably receiving a hook or other extension.

Figure 5A:
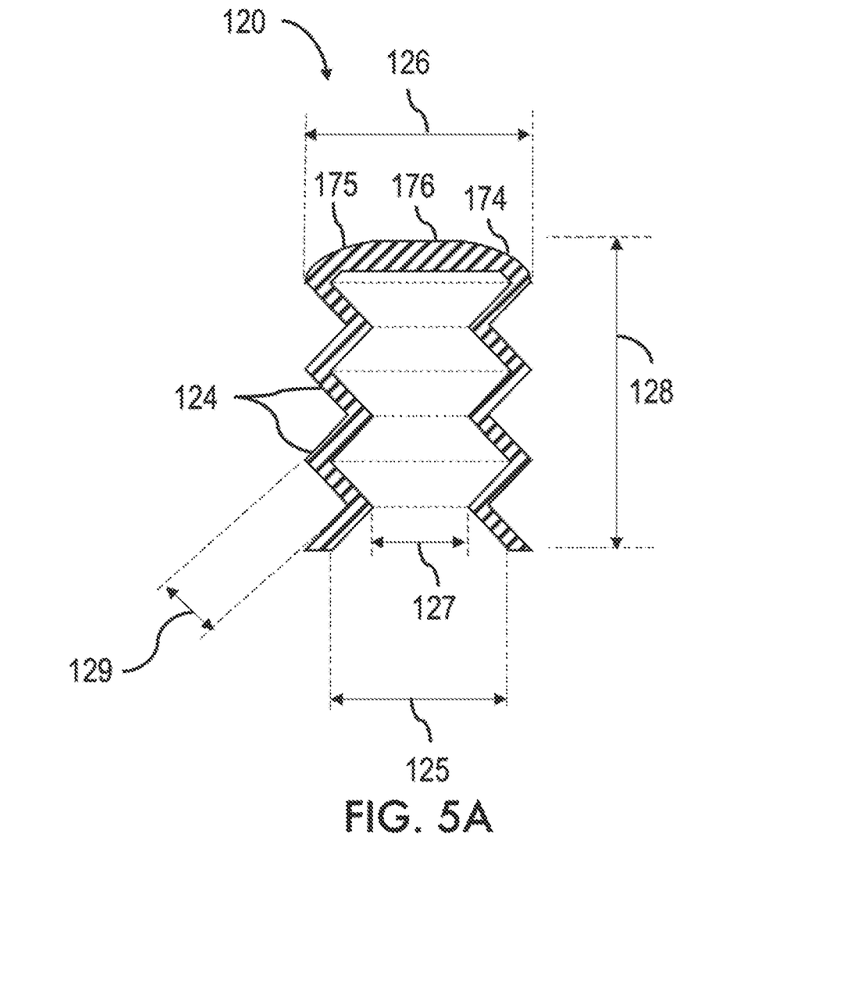
FIG. 5A is a cross-sectional view of an embodiment of an expandable section of a brace cap.

Referring to FIG. 5A, an embodiment of an expandable section 120 can be seen. As seen in FIG. 5A, in some embodiments, the expandable section 120 may comprise a plurality of segments 124, connected in an accordion-like configuration, to allow the expandable section 120 to expand in an accordion-like fashion.

In some embodiments, the plurality of segments 124 comprises 4-9 segments. In some embodiments, the plurality of segments comprises 6-7 segments.

In some embodiments, each segment 124 may have a length 129 that is between 0.3 mm and 0.4 mm. In some embodiments, each segment 124 may have a length 129 that is between 0.3 mm and 0.35 mm. In some embodiments, each segment 124 may have a length 129 that is 0.33 mm.

In some embodiments, the expandable section 120 may be configured to have a maximum inner diameter 125 that is greater than or equal to 0.7 mm and less than or equal to 0.9 mm. In some embodiments, the expandable section 120 may be configured to have a minimum inner diameter 127, when not expanded, that is greater than or equal to 0.1 mm and less than or equal to 0.3 mm. In some embodiments, the expandable section 120 may be configured to have a maximum outer diameter 126 that is greater than or equal to 0.9 mm and less than or equal to 1.1 mm.

In some embodiments, the expandable section is configured to extend to a total length 128 no more than 2.1 mm. In some embodiments, the expandable section is configured to extend no more than 2.1 mm from the outer surface of the central body.

In some embodiments, the expandable section may have a cap segment 174 at the outermost portion of the expandable section 120. The cap segment is configured to enclose the internal volume defined by expandable section. In some embodiments, the cap segment 174 may have a radius of curvature that is greater than or equal to 0.4 mm and less than or equal to 0.5 mm. In some embodiments, the radius of curvature is less than half the maximum outer diameter 126, thereby creating a flat surface 176 as the outermost portion of the expandable section 120.

Figure 5B:
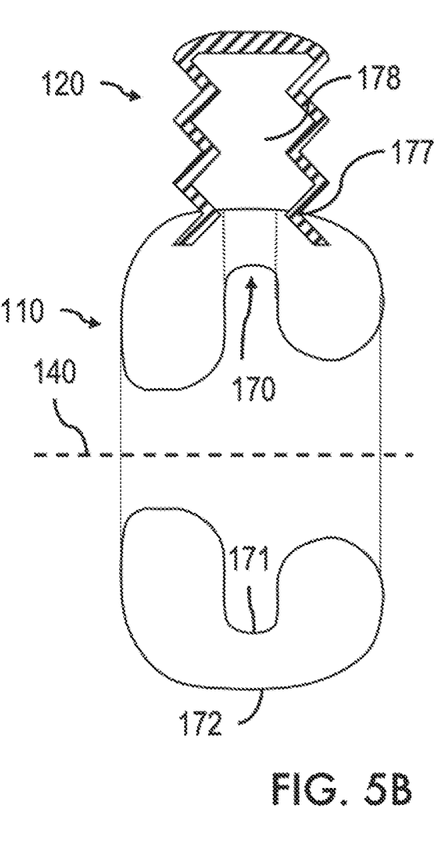
FIGS. 5B and 5C are a cross-sectional view of an embodiment of an expandable section coupled to a central body.

Referring to FIG. 5B, in some embodiments, the expandable section 120 is coupled at one or more attachment points 177 on an outer surface 172 of the central body 110. In some embodiments, the central body defines a lumen 170 extending from an inner surface 171 of the central body to the outer surface 172 of the central body, such that the lumen 170 is configured to open into the internal volume 178 defined by the expandable section 120.

Figure 5C:
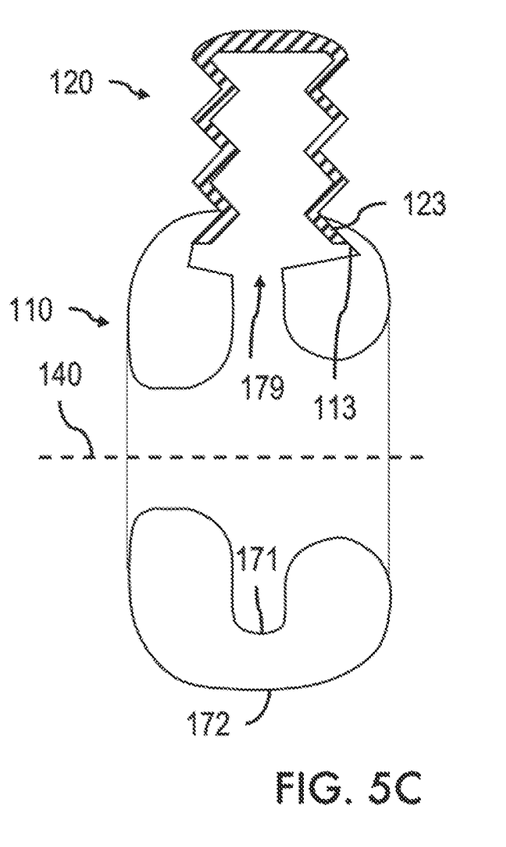

Referring to FIG. 5C, in some embodiments, at least a portion of an outer surface 123 of the expandable section 120 is coupled to an inner surface 113 of a lumen 179 extending at least partially from the inner surface 171 of the central body towards the outer surface 172 of the central body.

The brace cap 100 aims to provide convenient comfort to orthodontic patients from braces cuts and sores. The brace cap 100 is an effective and convenient solution for the issue of braces injuries. Not only is the brace cap 100 aimed at preventing injuries, unlike orthodontic wax and comfort lip bumpers that work to help protect an injury from worsening, but the brace cap 100 also makes patients' journey much easier. The brace cap 100 offers patients 24-hour protection in all possible scenarios like eating and sleeping. The brace cap 100 has no restrictions on food or activities aside from those restrictions standard to braces.

Figure 6A:
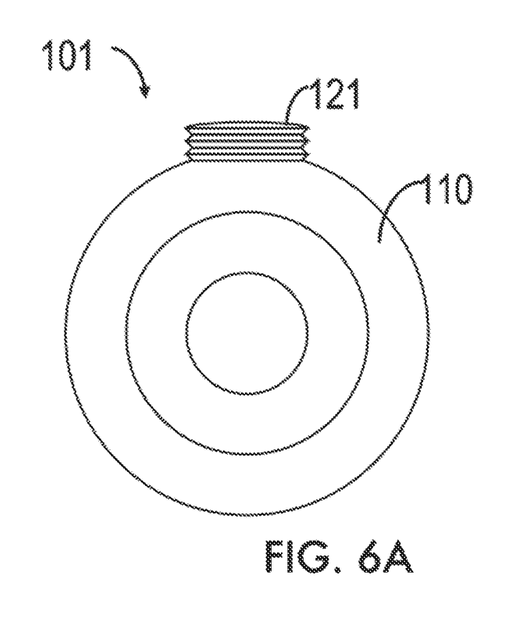
FIG. 6A is a schematic illustration of an embodiment of a brace cap with the expandable sections in collapsed configuration.
Figure 6B:
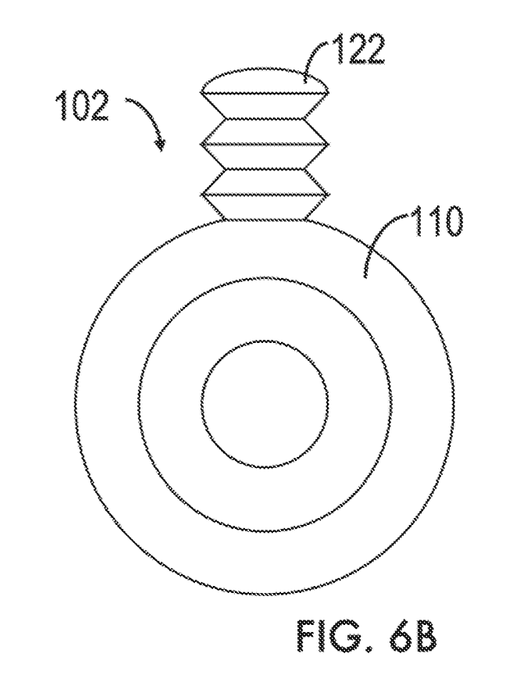
FIG. 6B is a schematic illustration of an embodiment of a brace cap with the expandable sections in expanded configuration.

Referring to FIG. 6A, a brace cap 101 is shown in a first configuration, where the central body is coupled to an expandable section 121 in the collapsed configuration. Referring to FIG. 6B, a brace cap 102 is shown in a second configuration, where the central body is coupled to an expandable section 122 in the expanded configuration. In is understood that a user can readily convert between these two configurations. In some embodiments, a user may be able to expand or collapse the expandable section 121, 122 by pulling the expandable section radially away from the central body or by pushing the expandable section radially towards from the central body, respectively.

The brace cap 100 may be placed on the brace bracket in a manner similar to how ligature ties are currently placed on brace brackets. As seen in FIG. 1, a ligature tie 3 is a rubber band that wraps around the base of the bracket 1 coupled to a tooth 5, holding the orthodontic wire 4 in place. The brace cap may be configured such that it not only wraps around and covers the bracket 1, but also around any sharp edges (if the expandable section is present, the expandable part can wrap around and cover an extension (or a hook) 2. With this design, the brace cap 100 serves the purpose of both ligature ties and orthodontic wax.

The brace cap 100 would be placed onto a patient's braces by an orthodontist during their routine appointment. By adding a cushioning layer to the bracket, the brace cap 100 works to prevent braces cuts and sores for patients and make their orthodontic journey just a little bit easier.

Specifically, a user can apply one or more brace caps according to any of the embodiments described herein, where each brace cap being applied is arranged around a brace bracket mounted on a tooth such that the second arm is closer to the tooth than the first arm. In some embodiments, the central body is configured to surround at least a portion of a brace bracket when installed.

Figure 7A:
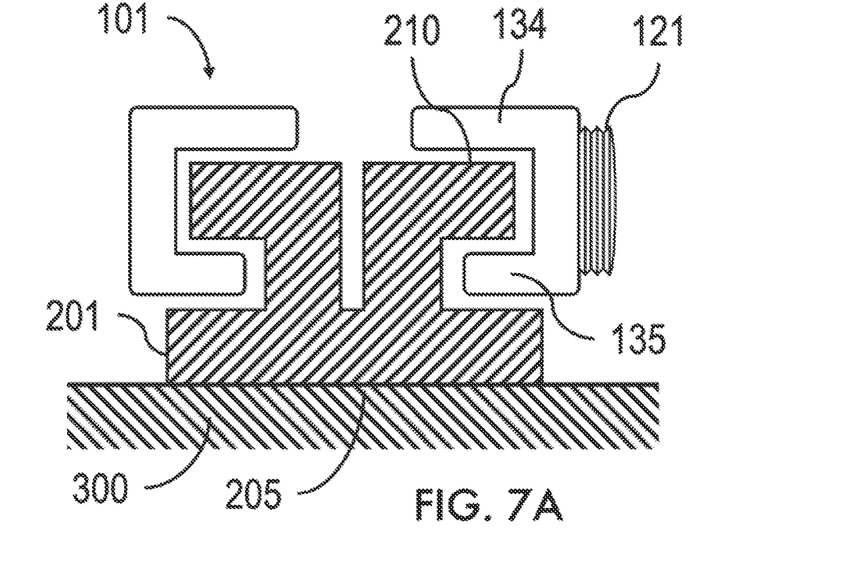
FIG. 7A is a cross-sectional view of a brace cap placement on orthodontic brace brackets with the expandable sections in collapsed configuration.

Referring to FIG. 7A, a cross sectional view of a brace cap 101 in position around a brace bracket 201 can be seen. A base 205 of the brace cap 201 is coupled to a surface of a tooth 300. The top portion of the central body, formed by the first arm 134 of the asymmetrical c-shape that forms the central body and the bottom portion of the central body, formed by the second arm 135 of the asymmetrical c-shape, are seen in place around the bracket, wrapped around a portion (including wing portion 210) of the base bracket 201. In FIG. 7A, the expandable section 121 is in the collapsed configuration, as there is no hook or extension portion that requires that aspect.

Figure 7B:
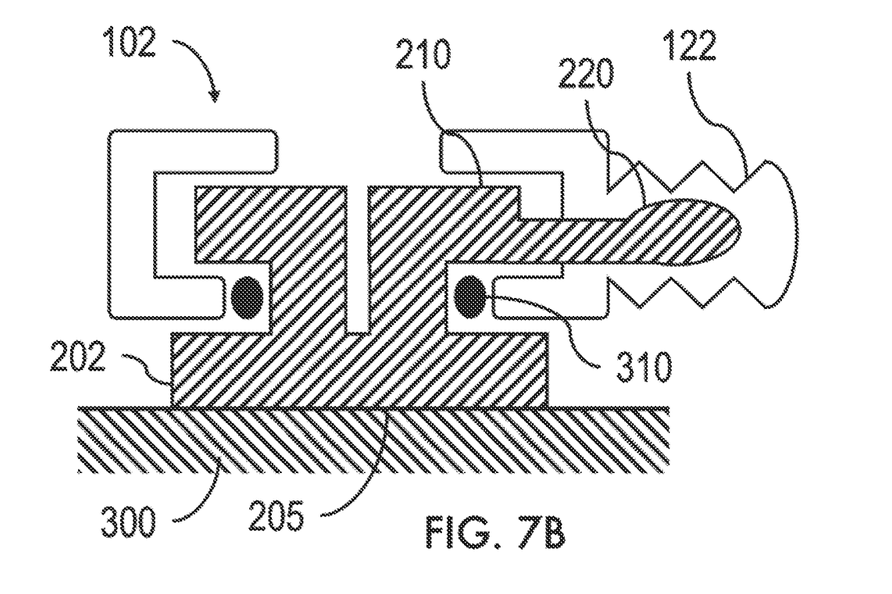
FIG. 7B is a cross-sectional view of a brace cap placement on orthodontic brace brackets with the expandable sections in expanded configuration, positioned around a hook.

Referring to FIG. 7B, a cross sectional view of a brace cap 102 in position around a brace bracket 202 can be seen. Here, like in FIG. 7A, a top portion of the central body and a bottom portion of the central body are wrapping around a portion (including wing portion 210) of the base bracket 202. However, FIG. 7B also shows that a ligature tie 310 can be in place around the bracket prior to the base cap being applied, such that at least a portion of the ligature tie 310 is positioned between the base bracket 202 and the base cap 201. In some embodiments, the brace cap is configured to cover at least a portion of the ligature tie 310. In some embodiments, the brace cap is configured to cover the entire ligature tie 310. Further, the expandable section 122 is in the expanded configuration, to allow the expandable section 122 to wrap around at least a portion of the extension piece 220 (such as a hook).

The brace cap may be configured using any appropriate material. In some embodiments, the brace cap comprises substantially non-degradable, biocompatible, elastomeric material. As used herein, the term "non-degradable" refers to a material that is not prone to degrading, decomposing, or breaking down to any substantial or significant degree while implanted in a host. Non-limiting examples of substantial non-degradation include less than 10% degradation the elastomeric material over a 1-year period. As used herein, the term "biocompatible" refers to a material's ability to be incorporated into a biological host (such as a person), without eliciting any undesirable local or systemic effects in that host. As used herein, the term "elastomer" or "elastic polymer" refers to an amorphous polymer that exists above its glass transition temperature ($T_g$) at ambient temperatures, thereby conferring the property of viscoelasticity so that considerable segmental motion is possible. Non-limiting examples of such polymers include carbon-based elastomers, silicon-based elastomers, thermoset elastomers, and thermoplastic elastomers. As used herein, the term "ambient temperature" refers to a temperature of about 18° C. to about 22° C. Elastomers, ether naturally occurring or synthetically made, comprise monomers commonly made of carbon, hydrogen, oxygen, and/or silicon which are linked together to form long polymer chains. Elastomers are typically covalently cross-linked to one another, although non-covalently cross-linked elastomers are known. Elastomers may be homopolymers or copolymers, degradable, substantially non-degradable, or non-degradable. Copolymers may be random copolymers, blocked copolymers, graft copolymers, and/or mixtures thereof. Unlike other polymers classes, an elastomer can be stretched many times its original length without breaking by reconfiguring themselves to distribute an applied stress, and the cross-linkages ensure that the elastomers will return to their original configuration when the stress is removed. Elastomers can be a non-medical grade elastomer or a medical grade elastomer. Medical grade elastomers are typically divided into three categories: non implantable, short term implantable and long-term implantable. Exemplary substantially non-degradable and/or non-degradable, biocompatible, elastomers include, without limitation, bromo isobutylene isoprene (BIIR), polybutadiene (BR), chloroisobutylene isoprene (CIIR), polychloroprene (CR), chlorosulphonated polyethylene (CSM), ethylene propylene (EP), ethylene propylene diene monomer (EPDM), fluoronated hydrocarbon (FKM), fluorosilicone (FVQM), hydrogenated nitrile butadiene (HNBR), polyisoprene (IR), isobutylene isoprene butyl (IIR), methyl vinyl silicone (MVQ), acrylonitrile butadiene (NBR), polyurethane (PU), styrene butadiene (SBR), styrene ethylene/ butylene styrene (SEBS), polydimethylsiloxane (PDMS), polysiloxane (SI), and acrylonitrile butadiene carboxy monomer (XNBR).

In some embodiments, the elastomeric material is a silicon-based elastomer. As used herein, the term "silicon-based elastomer" refers to any silicon containing elastomer, such as, e.g., methyl vinyl silicone, polydimethylsiloxane, or polysiloxane. A silicone-based elastomer may be vulcanized. A silicon-based elastomer can be a non-medical grade silicon-based elastomer or a medical grade silicon-based elastomer. In some embodiments, the elastomeric material may be a medical grade silicon-based elastomer. As used herein, the term "medical grade silicon-based elastomer" refers to a silicon-based elastomer that is at least Class V, or at least Class VI, as approved by the U.S. Pharmacopedia (USP). In some embodiments, the elastomeric material is a methyl vinyl silicone, a polydimethylsiloxane, a polysiloxane, or a combination thereof.

As seen in FIGS. 3-7B, the brace cap 100 is designed in such a manner that it cannot move around within a patient's mouth even when met with pressure from activities like sleeping. Therefore, the brace cap 100 will not face the same downfall that pliable orthodontic wax encounters. Not only is it steadfast in protecting patients, but the brace cap 100 also makes it possible for patients to eat with it on. The brace cap 100 is not heat sensitive, so patients do not have to worry about it collecting food or being swallowed like orthodontic wax. The brace cap 100 provides patients with new revolutions in comfort, and it accommodates all types of orthodontic treatments like rubber bands, something that is hard to accommodate with wax and even lip bumpers.

The brace cap 100 makes comfort convenient. Patients no longer need to go out of their way to relieve the pain of braces cuts and sores. The brace cap 100 would be placed onto a patient's braces by an orthodontist during their routine appointment, occurring every 4-6 weeks. The patient would not have to do any additional work in this process, aside from their routine cleaning with a small brush. Unlike the alternatives, patients can use the brace cap 100 without having to spend additional time on placement, spend excessive amounts of money, or bear the pain that comes from injuries to their inner cheeks and lip.

In some aspects of the present disclosure, a kit is provided. In some embodiments, the kit comprises a plurality of brace caps 100. In some embodiments, every brace cap in the kit comprises expandable section 120.

It is contemplated that, in practice, a combination of brace caps 100 with and without expandable sections 120 may be used together. For example, brace caps 100 with an expandable section 120 may be used as needed rather than being used on every brace bracket. Thus, in some embodiments, the kit comprises a plurality of brace caps each with expandable section 120, and a plurality of brace caps each without expandable section 120.

Although the technology has been described with reference to the embodiments illustrated in the attached drawing figures, equivalents may be employed, and substitutions may be made herein without departing from the scope of the technology as recited in the claims. Components illustrated and described herein are examples of devices and components that may be used to implement the embodiments of the present invention and may be replaced with other devices and components without departing from the scope of the invention. Furthermore, any dimensions, degrees, and/or numerical ranges provided herein are to be understood as non-limiting examples unless otherwise specified in the claims.

What is claimed is:

1. A brace cap, comprising:
a central body defined by an asymmetrical c-shape rotated around a central axis, the asymmetrical c-shape having a first arm and a second arm each extending towards the central axis,
wherein an innermost point of the first arm is offset radially from the central axis by a first radius, and an innermost point of the second arm is offset radially from the central axis by a second radius,
wherein the first arm is longer than the second arm, and
wherein the central body is configured to surround a brace bracket.

2. The brace cap according to claim 1, wherein the central body is configured to be used in place of a ligature tie.

3. The brace cap according to claim 1, wherein the central body is configured to be placed over a ligature tie.

4. The brace cap according to claim 1, wherein a total thickness of the central body is greater than or equal to 2.0 mm and less than or equal to 2.5 mm.

5. The brace cap according to claim 1, wherein an outer diameter of the central body is greater than or equal to 3 mm and less than or equal to 5 mm.

6. The brace cap according to claim 1, wherein the first arm defines a first inner diameter of the central body, where the first inner diameter is greater than or equal to 0.75 mm and less than or equal to 1.25 mm.

7. The brace cap according to claim 1, wherein the second arm defines a second inner diameter of the central body, where the second inner diameter is greater than or equal to 1.25 mm and less than or equal to 1.75 mm.

8. The brace cap according to claim 1, wherein the central body defines a maximum inner diameter that is greater than or equal to 2 mm and less than or equal to 4 mm.

9. The brace cap according to claim 1, further comprising an expandable section that extends radially outward from the central body and is adapted to surround at least one structure that extends from the brace bracket.

10. The brace cap according to claim 9, wherein the expandable section is configured to have a maximum inner diameter that is greater than or equal to 0.7 mm and less than or equal to 0.9 mm.

11. The brace cap according to claim 9, wherein the expandable section is configured to have a minimum inner diameter, when not expanded, that is greater than or equal to 0.1 mm and less than or equal to 0.3 mm.

12. The brace cap according to claim 9, wherein the expandable section is configured to have a maximum outer diameter that is greater than or equal to 0.9 mm and less than or equal to 1.1 mm.

13. The brace cap according to claim 9, wherein the expandable section is configured to extend no more than 2.1 mm from an outer surface of the central body.

14. The brace cap according to claim 9, wherein the expandable section comprises a plurality of segments connected in an accordion-like configuration.

15. The brace cap according to claim 9, wherein the expandable section is coupled to at least a portion of an internal surface of a lumen extending from an inner surface of the central body towards an outer surface of the central body.

16. The brace cap according to claim 1, wherein the brace cap is comprised of an elastomer.

17. A method for preventing damage or irritation from braces, comprising: applying one or more brace caps according to claim 1, each brace cap arranged around a brace bracket mounted on a tooth such that the second arm is closer to the tooth than the first arm.

18. A kit comprising a plurality of brace caps according to claim 1.

19. The kit according to claim 18, wherein the plurality of brace caps comprises a plurality of brace caps each comprising a central body and an expandable section, and a plurality of brace caps each comprising a central body without an expandable section.

20. The kit according to claim 18, wherein the plurality of brace caps comprises a plurality of brace caps each comprising a central body and an expandable section.

21. A brace cap, comprising:
- a central body defined by an asymmetrical c-shape rotated around a central axis, the asymmetrical c-shape having a first arm and a second arm each extending towards the central axis; and
- an expandable section that extends radially outward from the central body and is adapted to surround at least one structure that extends from the brace bracket, wherein the expandable section comprises a plurality of segments connected in an accordion-like configuration,
- wherein the first arm is longer than the second arm, and
- wherein the central body is configured to surround a brace bracket.

22. A brace cap, comprising:
- a central body defined by an asymmetrical c-shape rotated around a central axis, the asymmetrical c-shape having a first arm and a second arm each extending towards the central axis; and
- an expandable section that extends radially outward from the central body and is adapted to surround at least one structure that extends from the brace bracket, wherein the expandable section is coupled to at least a portion of an internal surface of a lumen extending from an inner surface of the central body towards an outer surface of the central body,
- wherein the first arm is longer than the second arm, and
- wherein the central body is configured to surround a brace bracket.

23. A kit comprising a plurality of brace caps, each brace cap comprising a central body defined by an asymmetrical c-shape rotated around a central axis, the asymmetrical c-shape having a first arm and a second arm each extending towards the central axis,
- wherein the first arm is longer than the second arm,
- wherein the central body is configured to surround a brace bracket, and
- wherein the plurality of brace caps comprises a plurality of brace caps each comprising a central body and an expandable section, and a plurality of brace caps each comprising a central body without an expandable section.

\* \* \* \* \*